(12) United States Patent
Graham

(10) Patent No.: US 11,761,452 B2
(45) Date of Patent: Sep. 19, 2023

(54) SEAL FOR A VACUUM PUMP

(71) Applicant: Edwards Limited, Burgess Hill (GB)

(72) Inventor: Ingo Stephen Graham, Burgess Hill (GB)

(73) Assignee: Edwards Limited, Burgess Hill (GB)

( * ) Notice: Subject to any disclaimer, the term of this patent is extended or adjusted under 35 U.S.C. 154(b) by 166 days.

(21) Appl. No.: 17/294,347

(22) PCT Filed: Nov. 12, 2019

(86) PCT No.: PCT/GB2019/053205
§ 371 (c)(1),
(2) Date: May 14, 2021

(87) PCT Pub. No.: WO2020/099859
PCT Pub. Date: May 22, 2020

(65) Prior Publication Data
US 2022/0003239 A1    Jan. 6, 2022

(30) Foreign Application Priority Data

Nov. 15, 2018    (GB) ...................................... 1818664

(51) Int. Cl.
*F04D 29/08* (2006.01)
*F16J 15/02* (2006.01)

(52) U.S. Cl.
CPC .......... *F04D 29/083* (2013.01); *F16J 15/025* (2013.01)

(58) Field of Classification Search
CPC .... F16J 15/00; F16J 15/46; F16J 15/48; F16J 15/02; F16J 15/021; F16J 15/022;
(Continued)

(56) References Cited

U.S. PATENT DOCUMENTS 3,167,322 A    1/1965    Aichroth
3,279,805 A *  10/1966   Quinson ................ F16J 15/127
                                                        277/611
(Continued)

FOREIGN PATENT DOCUMENTS

CN        202274096 U    6/2012
FR        2680222 A1     2/1993
(Continued)

OTHER PUBLICATIONS

Written Opinion and International Search Report dated Feb. 12, 2020 from counterpart International Application No. PCT/GB2019/053205, 13 pp.

(Continued)

*Primary Examiner* — Nathan Cumar
(74) *Attorney, Agent, or Firm* — Shumaker & Sieffert, P.A.

(57) ABSTRACT

A seal for use in a vacuum pump comprises a seal element positioned between inner and outer seal carriers located at the inner and outer surfaces of the seal element. Each of the seal element and carriers is substantially toroidal in shape. The outer carrier comprises retention means to hold the seal element in position. The inner carrier comprises at least one recess located in a surface adjacent to the seal element, and the seal element comprises at least one protrusion on an inner surface, which extends into the at least one recess of the inner carrier. A seal system comprises the described seal and first and second flanges. Methods for enhancing the chemical resistance of a seal system for use in a vacuum pump, and the use of the seal or seal system to connect pipework, are also provided.

19 Claims, 3 Drawing Sheets

(58) Field of Classification Search
CPC ........ F16J 15/024; F16J 15/025; F16J 15/027;
F04D 29/00; F04D 29/08; F04D 29/083;
F04D 29/086
USPC .......................................................... 277/562
See application file for complete search history.

(56) References Cited

U.S. PATENT DOCUMENTS

| | | | |
|---|---|---|---|
| 8,038,176 B2 | 10/2011 | Bowman et al. | |
| 2016/0245434 A1 | 8/2016 | Seeley | |
| 2017/0130881 A1* | 5/2017 | Edwards | ................ F16L 23/04 |

FOREIGN PATENT DOCUMENTS

| | | | | |
|---|---|---|---|---|
| FR | 2708983 A1 | 2/1995 | | |
| GB | 2455320 A | 6/2009 | | |
| JP | H07119657 A | 5/1995 | | |
| JP | H07119667 A | 5/1995 | | |
| JP | 2011038638 A | 2/2011 | | |
| JP | 5473400 B2 * | 4/2014 | ............ | F01C 19/005 |
| KR | 20140005007 A | 1/2014 | | |
| WO | 2010002695 A2 | 1/2010 | | |
| WO | 2018012743 A1 | 1/2018 | | |

OTHER PUBLICATIONS

Combined Search and Examination Report under Sections 17 and 18(3) dated Apr. 23, 2019 from counterpart GB Application No. 1818664.3, 6 pp.

Examination Report under Section 18(3) dated Mar. 2, 2021 from counterpart GB Application No. 1818664.3, 2 pp.

First Office Action and Search Report, and translation thereof, from counterpart Chinese Application No. 201980089175.5 dated Feb. 11, 2023, 20 pp.

* cited by examiner

SEAL FOR A VACUUM PUMP

This application is a national stage entry under 35 U.S.C. § 371 of International Application No. PCT/GB2019/053205, filed Nov. 12, 2019, which claims the benefit of GB Application No. 1818664.3, filed Nov. 15, 2018, the entire contents of each of which are incorporated herein by reference.

TECHNICAL FIELD

The present disclosure relates to a seal and seal systems for use in a vacuum pump, equipment, including a vacuum pump, comprising a seal or seal system, and methods for enhancing the chemical resistance of a seal system, in particular for use in a vacuum pump.

BACKGROUND

The on-going development of new applications for vacuum pumps, in particular in the semiconductor, flat panel and solar panel manufacturing industries, has led to ever-increasing operational temperatures being required. In particular, new applications and products are driving up pump exhaust gas temperatures. Temperatures reached by the parts of vacuum pumps can be extremely high, for instance as high as 300° C. in some cases. The temperatures are affected not only by the heat generated by operation of the pump itself, but also by the ambient temperature at the location of the pump, which can be affected by both active heating and insulation, for example. Thus, all parts of vacuum pumps are required to operate effectively and reliably at temperatures spanning a wide range and which can be very high.

In addition, depending upon the type of process in which the equipment is used, it can also be required to have good chemical resistance. For instance, if a pump is used in a semiconductor manufacturing process, it should not only be resistant to the raw materials used to make the semiconductors, but also to the chemicals used to clean to system, for example cleaning gasses.

Whilst fluorinated "FKM-type" elastomers have been widely used as sealing materials in vacuum pumps, they have been found to have unacceptable lifetimes at higher temperatures. Perfluorinated "FFKM-type" elastomer seals typically have acceptable temperature resistance up to approximately 240° C., for instance. However, the addition of even small concentrations of aggressive process etch or cleaning gasses can compromise their properties and, therefore, their sealing performance. Therefore, FFKM-type materials also have a service life too short to offer a long-term, commercially viable solution for high temperature vacuum pump applications, as they typically require replacement every 3 to 6 months, whereas it is desirable to provide seals with lifetimes in excess of a year. Metal seals are also proposed for use in high temperature applications, however, there are drawbacks associated with their use. For example, the clamping forces typically required to tighten metal seals are very high. In addition, the seals are typically sensitive to the way in which the clamping forces are applied, such that gradual, time-consuming tightening methods must generally be employed to avoid over-tightening of the seals at any stage in the process. Such over-tightening can compromise the performance of metal seals, thus leading to less effective sealing capability.

It would, therefore, be desirable to provide an effective seal system with enhanced chemical resistance, in particular at higher temperatures, for use in equipment such as vacuum pumps.

SUMMARY

The present disclosure provides a seal for use in a vacuum pump comprising a seal element, which is positioned between an inner seal carrier and an outer seal carrier, which are respectively located at the inner and outer surfaces of the seal element. Each of the seal element and inner and outer seal carriers is substantially toroidal in shape, and the outer seal carrier comprises retention means to hold the seal element in position. The inner seal carrier comprises at least one recess located in a surface adjacent to the seal element, while the seal element comprises at least one protrusion on an inner surface, which protrusion extends into the at least one recess of the inner seal carrier.

The present disclosure also provides a seal system for use in a vacuum pump, which comprises a seal as described above, and first and second flanges which are positioned at either side of the seal.

A further aspect of the disclosure provides a vacuum pump comprising a seal or seal system as described above.

Still further aspects of the disclosure provide methods for enhancing the chemical resistance of a seal system for use in a vacuum pump, in which a seal or seal system as described above is fitted into a vacuum pump.

Yet further aspects of the disclosure provide equipment comprising the above-described seal or a seal system, wherein the seal or seal system connects a first pipe to a second pipe. Use of the seal or seal system to connect a first pipe to a second pipe is also provided.

Other preferred aspects of the disclosure are defined in the accompanying claims.

The seals and seal systems in accordance with the present disclosure impart extremely effective sealing to a variety of industrial equipment, in particular vacuum pumps, which operate at high temperatures and often also under extreme chemical conditions. Equally, however, use of the seals and seal systems disclosed herein beneficially increases the effective chemical resistance of any seal element irrespective of its operating temperature.

Seals in accordance with the present disclosure comprise a seal element positioned between an inner seal carrier and an outer seal carrier. The inner and outer seal carriers are respectively located at the inner and outer surfaces of the seal element. For instance, in the case of a seal with a generally circular, or annular, cross-section, the inner surface of the seal element is the circular surface or edge located inside the annulus, whereas the outer surface or edge is that located at the outside of the annulus. Accordingly, the overall seal structure may be thought of as a concentric sandwich comprising the seal element sandwiched between the seal carriers. Each of the seal element and inner and outer seal carriers is typically substantially toroidal in shape. Thus, each of these parts typically has a ring-like shape, which is typically circular, although it is envisaged that other shapes, which may be concentrically arranged as described above, would also be usable. For example, the parts may comprise an oval-shaped cross-section. Alternatively, for instance, at least the seal element may comprise a cross-shaped cross-section, either with or without a void in the centre. Such a seal element may, for example, be used in conjunction with conventionally-shaped seal carriers, for instance those having a circular or oval cross-section. For instance, it is envisaged that any concentrically shaped (for instance, round, square, rectangular, oval) seal carrier may be used in conjunction with a seal element with a cross-section which may itself be, for example, round, square, rectangular, oval, cross-shaped, L-shaped, v-shaped.

In a seal according to the present disclosure, the outer seal carrier comprises retention means to hold the seal element in position, in particular during assembly. For instance, the outer seal carrier may comprise one and preferably at least two protrusions or lips, which extend from the surface of the outer seal carrier, which is positioned adjacent to the seal element. Thus, the seal element is preferably held in place between the lips. More preferably, the protrusions, or lips, continuously extend around the surface of the outer carrier in a substantially parallel arrangement such that they form a recess or groove in which the outer edge of the seal element sits. Other seal element retention arrangements known in the art are also usable in the seals of the present disclosure. The retention means should be such that, during operation of the vacuum pump, when the equipment is at temperature, they do not introduce pinch points which might create local stresses and/or initiate degradation sites in the seal. Representative seals in accordance with the present disclosure may comprise retention means or lips of approximately 2 to 3 mm height, for instance about 2.5 mm.

Typically and preferably, the retention means and the outer seal carrier are unified. That is, they are comprised in a single unit, and are typically and preferably formed from the same material. Alternatively, the seal element may be attached to the outer seal carrier by bonding means such as an adhesive, for example. Suitable adhesives are widely available in the art, and the choice of adhesive may be readily made based upon, for example, the nature of the materials to be bonded together and/or the operating conditions to which the bonded parts will be subjected, for instance.

In the seal of the present disclosure, the inner seal carrier comprises at least one recess, or groove, located in a surface adjacent to the seal element, and the seal element comprises at least one protrusion on an inner surface, which protrusion extends into the at least one recess of the inner seal carrier.

Preferably, the recess comprises a continuous recess, or groove which extends around the outer surface of the inner seal carrier adjacent to the seal element. However, the inner seal carrier may alternatively comprise more than one recess, each of which is located at a position in the outer surface of the inner seal carrier which corresponds to the location of the at least one protrusion upon the inner surface of the seal element. Preferably, in such an arrangement, the recesses are located substantially equidistantly from one another.

The at least one protrusion, which is present on the seal element, determines the radial and axial location of the inner seal carrier, while the seal element is typically radially (and axially) located by the outer seal carrier, and/or flange in a seal system according to the present disclosure. Seals in accordance with the present disclosure comprise at least one protrusion and may comprise at least two and more preferably at least three such protrusions. Most preferably, the seal comprises three protrusions. Alternatively, the at least one protrusion may comprise a single, continuous protrusion which extends around the inner surface of the seal element.

In preferred arrangements according to the present disclosure, the seal element or inner seal carrier comprises multiple (for instance, three or more) protrusions, or spokes, which extend into a single continuous recess located in the surface of the inner seal carrier. More preferably, the multiple protrusions, or spokes, are positioned substantially equidistantly around the surface upon which they are located. A particularly preferred arrangement comprises a seal element with three spokes extending into a single, continuous groove in the surface of the inner seal carrier.

Typically and preferably, the at least one protrusion, or spoke, and the seal element are unified. That is, they are comprised in a single unit and are typically and preferably made from the same material.

In arrangements in accordance with the present disclosure, which comprise a single, continuous protrusion, it is desirable to provide the protrusion with at least one hole or orifice. This is so that, during use and when gas is provided to the seal system, efficient provision of gas to the entirety of the cavity, which is formed between the surfaces of the seal element, inner seal carrier and flanges, may be facilitated due to flow of the gas through the at least one hole in the protrusion.

The at least one protrusion, or spoke, is typically such that it is sufficiently robust to support the inner seal carrier when the overall seal is in an uncompressed state. The dimensions of the at least one protrusion and the at least one recess are preferably such that, in use, when the seal is compressed, and preferably at the desired operational temperature, the at least one protrusion extends further into the at least one recess. As such, in an uncompressed state, there is typically a void located between the leading edge of the at least one protrusion and the base of the recess interior, into which the protrusion can move during compression of the seal. Preferably in this situation, the spokes remain uncompressed to any significant extent. In other words, the further protrusion of the spokes into the recess during operation, does not impart any undesirable stress to the spokes or, therefore, the overall seal arrangement.

Alternatively, the at least one protrusion or spoke may be designed, for instance through choice of material and/or dimensions, such that it will flex when the seal is compressed. However, any such flexing forces should not detrimentally affect the performance of the seal to any significant extent.

Given the ever-increasing temperatures at which vacuum pumps are required to operate, it is desirable that each of the parts of the seal disclosed herein have adequate temperature resistance at the relevant operating temperatures. Suitable materials should therefore preferably be resistant to temperatures of at least about 150° C. More preferably, the materials are resistant to temperatures of at least about 170° C., at least about 190° C., at least about 200° C., or at least about 220° C. Particularly preferred materials are resistant to temperatures of from about 150° C. to about 300° C., or even higher, more preferably from about 170° C. to about 270° C., yet more preferably from about 190° C. to about 260° C., and even more preferably from about 200° C. to about 250° C.

In addition and as described above, it is of course, although not required in some embodiments it may be desirable for the materials used to form the seal parts to be resistant to chemicals, which they will encounter during use, for example the raw materials, chemical products and cleaning agents which come into contact with the seals.

Preferred materials for the seal element and seal carriers include metallic, ceramic and polymeric materials. Preferably the seal element comprises a polymeric material, which is more preferably an elastomeric material. Even more preferably the seal element comprises a silicone-based, fluorinated silicone-based, fluoroelastomer-based or perfluoroelastomer-based polymer, which types of polymers are known in the art as VMQ, FVMQ, FKM and FFKM types, respectively. Examples of commercially available polymer grades suitable for use in accordance with the present disclosure include, for example, Sil 80/2 and FR 10/80 polymer grades available from James Walker UK Ltd (Crewe, UK); Polymer grade 714534 available from ERIKS UK (Halesowen, UK); the VCT® and ISOLAST range of polymers available from Trelleborg Sealing Solutions UK Ltd (Solihull, UK); the Kalrez® polymer range available from DuPont(UK) Ltd (Stevenage, UK); the Chemraz® polymer range available from Greene Tweed UK (Nottingham, UK), the Simriz® polymer range available from Freudenberg Sealing Technologies (Lutterworth, UK); and the Perlast® polymer range available from PPE (Blackburn, UK). As described above, the specific choice of material from which the different parts of the present seals are made will depend, for instance, upon the temperature capability required.

It is particularly advantageous that the present disclosure facilitates the use of these types of materials for high temperature vacuum seal elements, or indeed in applications where the temperature capability of the seal is adequate, but the chemical resistance is not, as the FFKM-type materials typically used in such applications are significantly more expensive, for instance of the order of over ten times more expensive than silicone-based materials. Nevertheless, FKM- and FFKM-type materials are also usable in the seal elements of the present disclosure.

The inner seal carrier may be formed from any material typically used to form the inner ring of a standard (e.g. NW40) O-ring seal, for instance, as long as its temperature resistance is appropriate for the process the seal will be used in. In addition, it is desirable that the chemical resistance of the inner seal carrier material is appropriate for its intended use. The inner seal carrier preferably comprises metallic or ceramic material. More preferably, the material used for the inner seal carrier is resistant to corrosion caused by materials being pumped by the vacuum pumps, for instance gaseous and moist halogens, interhalogens, hydrogen-halides and other chemicals used in the production of semi-conductors. Preferred examples of materials suitable for the inner seal carrier include stainless steels, for instance austenitic stainless steel, such as type 316L for example, and superaustenitic stainless steel, Inconel alloys, and corrosion-resistant high-temperature coatings such as materials with electroless nickel-plated (ENP) coatings.

The inner seal carrier is typically dimensioned such that, when the seal is incorporated into a seal system additionally comprising flanges, the inner seal carrier forms good contacts with the flange surfaces. In more detail, the contact between the inner seal carrier and flange surfaces should be such that, during use, the gas which is provided to the cavity formed by the surfaces of the inner seal carrier, seal element and flanges, seeps but does not freely flow between the inner seal carrier and flange surfaces. The surfaces of the inner seal carrier (and flange) are preferably ground to produce the desired geometry (Surface finish). Other known techniques such as cutting, turning or milling may be used, but are generally less controllable than grinding and therefore less desirable.

The outer seal carrier may be formed from any material typically used to form the outer ring of a standard O-ring seal, for instance, again as long as its temperature resistance is appropriate for the intended use. The outer seal carrier may comprise a metallic, polymeric (eg. a high temperature polymer) or ceramic material. Preferably, the outer seal carrier comprises metallic material. Preferred examples of materials suitable for the outer seal carrier include aluminium and stainless steel, for example 316L stainless steel.

The above-described seal is effectively incorporated into a seal system for a vacuum pump, which additionally comprises first and second flanges positioned at either side of the seal.

The components of the seal system are positioned such that surfaces of the seal element, inner seal carrier and first and second flanges define a cavity, or void, within the seal system. The seal system preferably also comprises means for supplying gas to the cavity. Preferably, at least one flange, for instance the first flange, comprises an inlet port, ie. a port or bore, which extends from an exterior surface of the flange to the surface which is adjacent to the seal and through which, during use of the vacuum pump, gas is fed into the cavity defined by the surfaces of the seal system components. It is particularly preferred that the gas is an inert gas, such as nitrogen, which is typically available as a purge gas in vacuum pumps.

The introduction of gas into the seal system causes the pressure difference ($\Delta P$) across the seal element ($P_{ID}-P_{OD}$; where $P_{ID}$ is the pressure on the seal element's inner surface or diameter and $P_{OD}$ is the pressure on the element's outer surface or diameter) to always be positive. In contrast, in seal systems of the art, the pressure difference is typically subject to the variation of the gas pressure on the seal element's inner diameter, which is typically mildly sub-atmospheric when used in an exhaust pipe arrangement, for example, or substantially sub-atmospheric in the swept volume of a vacuum pump. Therefore, in seal systems of the present disclosure, the constant positive pressure difference allows circumferential location of the sealing element on the inner diameter, or surface, of the outer seal carrier, which is beneficial in terms of facilitating the desired correspondence between the seal element and the seal carriers (as previously described).

It is preferred that the gas inlet port is positioned, ie. exits a first flange into the cavity, at a location which is approximately equidistant between the compressed seal element at the point at which it touches the first flange, and the inner seal carrier at the point at which it touches the first flange. For instance, in representative seal systems, the distances between each of the seal element and the inner seal carrier to the inlet port can be approximately 0.5-3 mm, for instance about 1.5 mm. Representative systems typically comprise inlet ports with diameters of about 0.5 mm to about 1.5 mm, for instance approximately 1 mm.

As described above, the gas supplied to the seal systems of the present disclosure during use is preferably an inert gas, and is more preferably nitrogen. Nitrogen is typically available in vacuum pumps as it is often used as a purge gas. During use, the gas is thus fed directly into the cavity between the seal element and the inner seal carrier, which is bordered by the flanges. The shape of the cavity filled with the gas corresponds to those of the seal element and seal carrier and is therefore typically substantially toroidal although, as already described above in relation to the seal element and seal carriers, other geometries are also applicable to the present disclosure.

The at least one flange inlet port, or bore, in the seal systems of the present disclosure may be adapted to incorporate a radial boss, to which a standard nitrogen gas fitting (typically approximately 6 mm in diameter) may be attached. The distribution of the gas to the flange may be achieved by means of a central gas distribution system or manifold, or independently such that the gas supply is independent of the equipment comprising the seal system.

The gas contained in the seal systems of the disclosure during use is preferably maintained at a relative small positive pressure, for instance about 1.3 to about 1.6 bar absolute, but it can also be above or below this. The pressure is typically set and monitored by standard pressure regulation apparatus, for instance a pressure regulator located on the manifold or on the independent gas supply.

During use and as already mentioned, the gas is vented from the cavity within the seal system via the interface(s) between the inner seal carrier and the flange(s). The rate of escape of the gas through this interface is typically relatively low, for instance of the order of less than about 1 standard litre per minute (slm) for an "NW40-sized" seal, and typically very much less than this, for example approximately 0.1 sccm or even less, such that the gas is considered to seep rather than flow out of the cavity. The rate of escape is typically dependent upon the nature of the surface finish on the flanges. Because of this seepage of gas, which is offset by the supply of gas to the cavity, the pressure of the gas within the cavity remains relatively constant and does not tend to fluctuate to any great extent.

The flanges comprised in the seal systems disclosed herein are typically made from materials conventionally used in the manufacture of flanges in existing vacuum pumps and should, therefore, have appropriate temperature and chemical resistance. The materials described above as suitable for the seal carriers, and in particular the inner seal carrier, are also suitable for the flanges. Examples of suitable materials, therefore, include metallic materials such as aluminium and stainless steel, in particular Type 316L stainless steel; polymeric materials, in particular high temperature polymers; and ceramic materials, for instance.

The supply of gas directly into the space defined by the seal, inner seal carrier and flanges creates a barrier to process gasses and effectively enhances the chemical resistance of the seal systems, in particular those used in vacuum pump applications. The present disclosure therefore facilitates the use of seal element materials which are resistant to higher temperatures, but which have lower chemical stability, than materials currently used or proposed for use due to their enhanced chemical resistance (such as FKM- and FFKM-type materials). Advantageously, therefore, the present disclosure enables the use of a wider variety of sealing materials and, importantly, cheaper sealing materials such as the silicone-based materials described above.

The present disclosure thus advantageously provides seals and sealing systems with longer service lifetimes than those currently available for higher temperature applications. In addition, the cost of such seals and seal systems is significantly reduced due to the ability to use cheaper sealing materials for any given process challenge at any temperature.

The present disclosure therefore also provides methods for enhancing the chemical resistance, and thus the service lifetime, of seals and seal systems for use in vacuum pumps by fitting a seal or a sealing system as described herein into a vacuum pump. The vacuum pumps may be newly manufactured, or may be existing pumps, which comprise seals or seal systems which require replacement as they have reached the end of their service lifetime. Accordingly, the present disclosure covers retrofitting of the disclosed seals or seal systems into existing vacuum pumps as well. Preferably, the methods further require the supply of an inert gas, which is more preferably nitrogen, into the seal system during use.

The seals and seal systems according to the present disclosure therefore find particular use in vacuum pumps for use in a wide variety of applications including, for example, the semiconductor, flat panel and solar panel manufacturing industries. Such vacuum pumps typically operate at temperatures of about 60° C. or higher. The seals and seal systems are particularly preferred for vacuum pumps for use in semiconductor manufacturing. More preferably, the seals and seal systems find particular use in dry vacuum pumps. Yet more preferably, the seals and seal systems find specific use as stator seals and stator seal systems in vacuum pumps and, in particular, in dry vacuum pumps. The seals and seal systems of the present disclosure may also be used in compressors.

The seals and seal systems according to the present disclosure also find use in other equipment where effective sealing is required, for instance equipment comprising pipework. For example, a seal or seal system according to the present disclosure may be comprised in equipment wherein the seal or seal system connects a first pipe to a second pipe. Use of the seals or seal systems in such equipment provides connecting means with enhanced chemical resistance, in particular at high operational temperatures. Accordingly, they are particularly well-suited to use in exhaust pipes, for instance, and therefore find particular use in abatement systems. The seals and seal systems may be fitted into newly manufactured equipment, such as pipework, and can also advantageously be used to replace existing seals or seal systems in pipework, in particular in abatement systems, and other such equipment, which have reached the end of their service lifetime.

BRIEF DESCRIPTION OF THE DRAWINGS

The present disclosure will now be described in more detail with reference to the accompanying figures.

DETAILED DESCRIPTION

Figure 1:
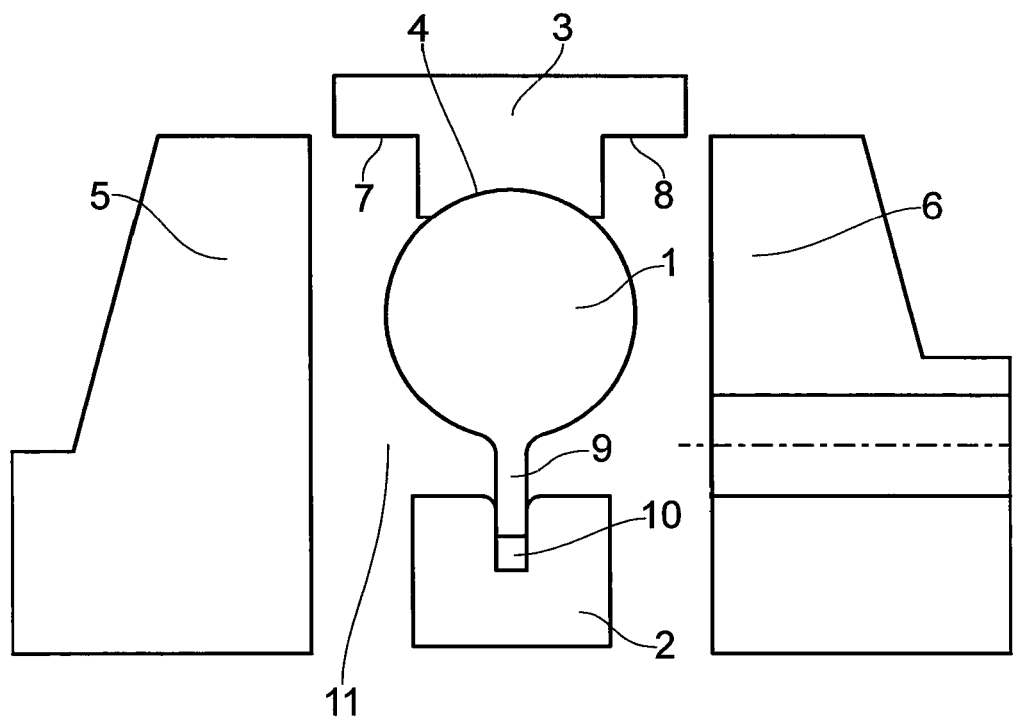
FIG. 1 is a cross-sectional side view of a seal system in accordance with the present disclosure.

The present disclosure provides a seal and a seal system for use in a vacuum pump. With reference to FIG. 1 in an example, the seal system comprises a seal element (1) positioned between an inner seal carrier (2) and an outer seal carrier (3). The seal element (1), inner seal carrier (2) and outer seal carrier (3) are each substantially toroidal in shape, sharing the same central axis (A; see FIG. 3). The inner seal carrier (2) and outer seal carrier (3) are respectively located at the inner and outer surfaces of the seal element, wherein the inner surface is the surface closest to the central axis (A) and the outer surface is the surface radially farthest from the central axis (A).

In use, the outer surface of the seal element engages with the inner surface of the outer seal carrier (4). In this example, the inner surface of the outer seal carrier (4) has a shape complimentary to that of the outer surface of the seal element (doesn't have to be—so long as it is located axially ie held in place); in this example the inner surface of the outer seal carrier (4) has a concave portion, wherein, in this example, the radius of the concave portion is the same as that of the seal element. The radius of the cross-section of the seal element may be between about 1 mm and about 10 mm, for example about 5 mm.

The seal element is also engaged by first and second flanges (5) & (6), which each respectively form part of the two components (for example 13 and 14 in FIG. 4) bridged by the seal system. The first and second flanges (5, 6) are substantially parallel with each other, with the seal element (1) sandwiched therebetween. The inner seal carrier (2) comprises axially outer surfaces with which the first and second flanges (5, 6) are respectively engaged. The outer seal carrier (3) comprises first and second shoulders which provide relative radial positioning for the first and second flanges (5, 6). The axial thickness of the outer seal carrier must always be smaller than the inner seal carrier to allow the inner seal carrier to engage with the first and second flanges (5, 6).

The seal element (1) further comprises a protrusion (9) on the inner surface of the seal element. The outer surface of the inner seal carrier (2) comprises a recess (10). The recess (10) is configured to receive the protrusion (9). In the "uncompressed" state and in the example shown in FIG. 1, the protrusion (9) does not extend fully into the recess (10). Instead a gap remains in the recess at an upper portion of the recess, into which the protrusion (9) may extend when the seal is further compressed. The recess—protrusion relationship determines the location of the inner seal carrier (2) in relation to the seal element (1). The corners at which the recess (10) joins the outer surface of the inner seal carrier (2) are typically shaped, as shown in FIG. 1 for example, to prevent damage to the protrusion (9) during movement of it within the recess (10). There should also be sufficient axial clearance to allow the protrusions to expand and contract.

Figure 4:
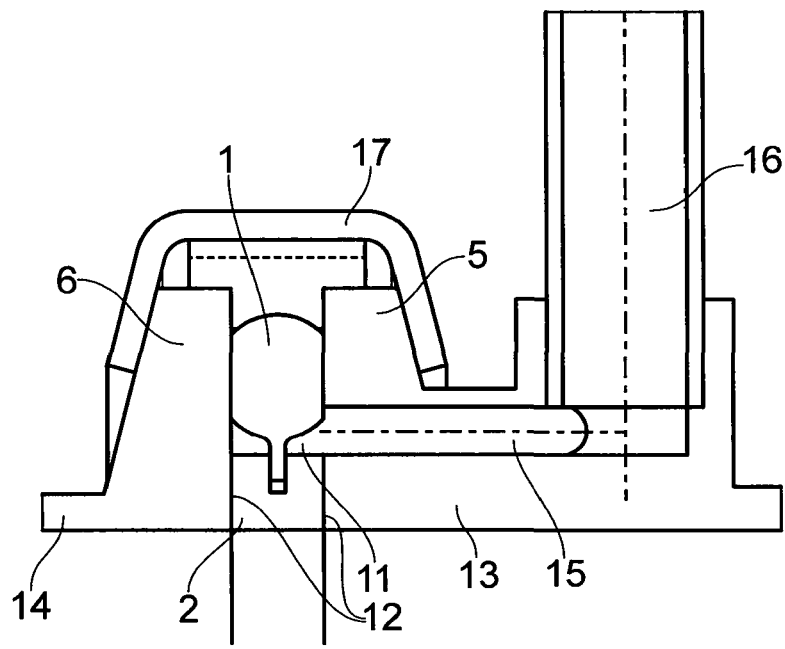
FIG. 4 is a partial cross-sectional side view of a seal system in accordance with the present disclosure showing the gas supply.
Figure 5:
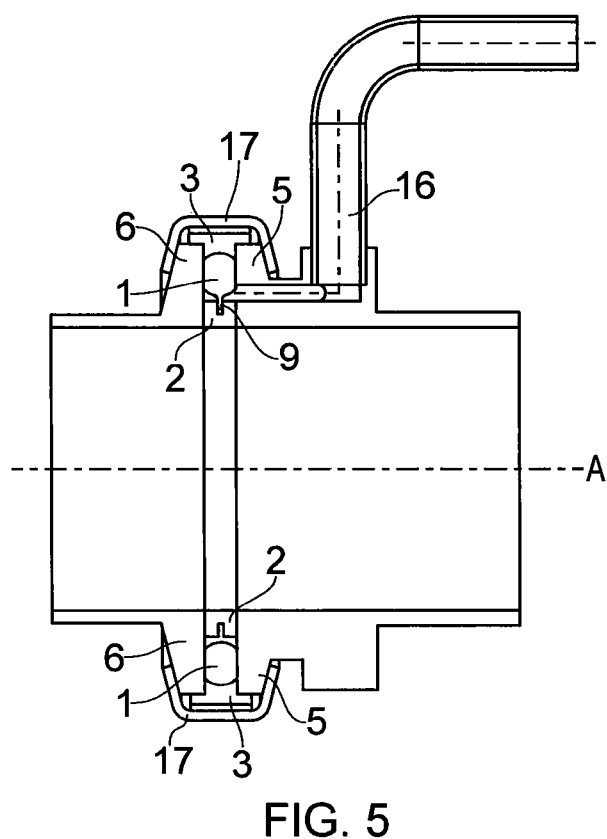
FIG. 5 is a cross-sectional side view of a seal system in accordance with the present disclosure showing the gas supply.

A cavity (11) is created within the seal system, defined by the surfaces of the seal element (1), the inner seal carrier (2), and the first and second flanges (5, 6). The seal system further comprises means for supplying gas to the cavity (as shown in FIGS. 4 and 5, for example). This gas is preferably an inert gas, for example nitrogen. The gas flows into the cavity (11) and fills it such that there is a small positive pressure difference between the cavity (11) and outside of the seal system. The gas gradually seeps out of the cavity (11) at the connecting surfaces (12) between the inner seal carrier (2) and the first and second flanges (5, 6) respectively.

Figure 2:
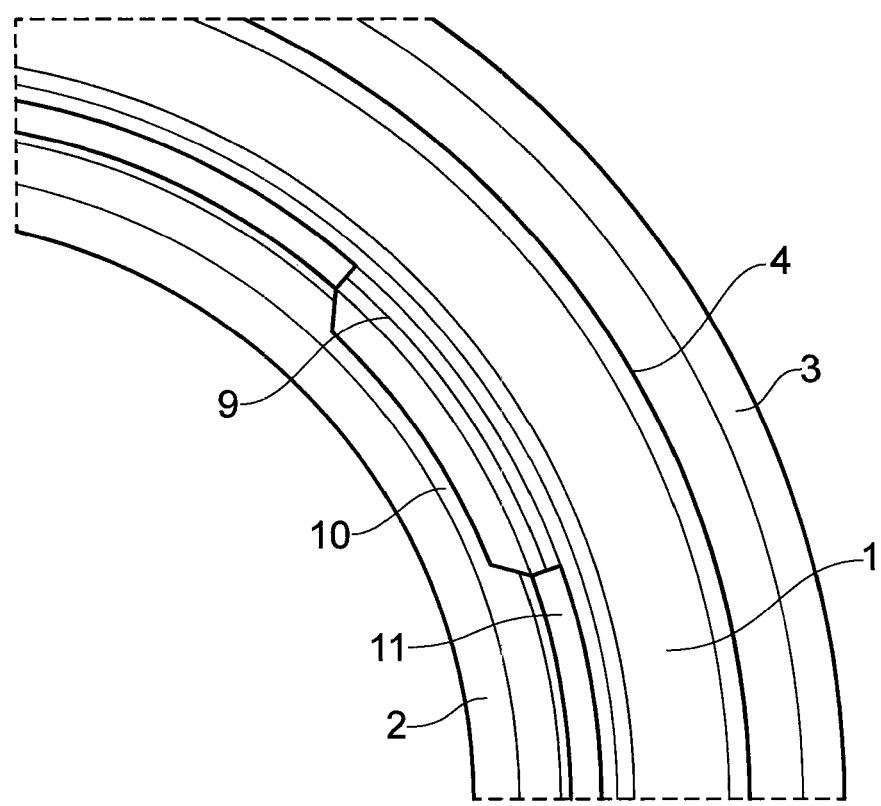
FIG. 2 is a partial cross-sectional view of a seal system in accordance with the present disclosure.

FIG. 2 illustrates a partial cross-section of the seal viewed along the central axis (A). The outer surface of the seal element (1) is engaged around its entire circumference with the inner surface (4) of the outer seal carrier (3). The seal element (1) further comprises a protrusion (9) on its inner surface. In this embodiment, the protrusion (9) is in the form of a spoke that is inserted into the recess (10) of the inner seal carrier (2). The spoke (9) is 0.55 mm thick, 2 mm long, 9 mm wide, for example.

FIG. 2 shows that, in this example of the present disclosure, the recess (10) extends about half way through the diameter of the inner seal carrier (2). The length of the spoke (9) is greater than the depth of the recess (10). Therefore, even when the spoke (9) extends completely into the recess (10), such that the end of the spoke (9) is in contact with the base of the recess (10), the cavity (11) is still present at the outer surface of the inner seal carrier (2). The principal purpose of the spoke is radial positioning of the inner seal carrier and ensuring that it is even when the axes of the seal element and inner SC are not co-incident.

When the protrusion is configured as one or more spokes (9) rather than a single continuous protrusion, this allows gas to flow through the spaces between the spokes and fill the entire cavity (11). Whereas, if the protrusion is configured as a single continuous protrusion, in order to facilitate gas flow from one side of the protrusion to the other, at least one orifice must be provided in the protrusion to allow the gas to flow and fill the entirety of the cavity (11), thus ensuring that there is not a pressure difference between the two sides of the protrusion.

Figure 3:
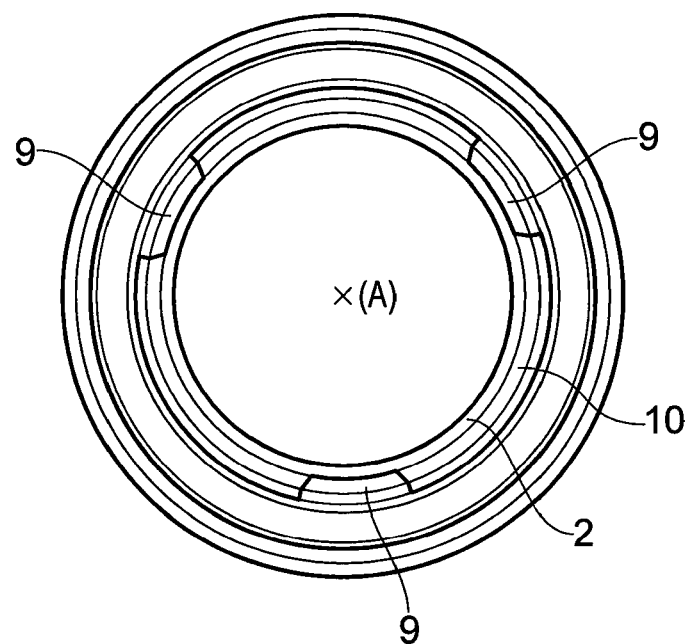
FIG. 3 is a cross-sectional view of a seal system in accordance with the present disclosure.

FIG. 3 illustrates a cross-sectional view along the central axis (A) of a seal system according to the present disclosure. More specifically, the protrusions (9) are configured as three spokes, spaced equidistantly about the internal circumference of the seal element (1). Each of the spokes (9) protrudes into the recess (10) in the outer surface of the inner seal carrier (2). In this example, the recess (10) is a single continuous channel that extends around the entire external circumference of the inner seal carrier (2).

FIG. 4 illustrates a partial cross-sectional view of a seal system according to the present disclosure. In this example, the first and second flanges (5, 6) are integrated parts of the first and second components (13, 14), respectively, on to which the sealing system is mounted.

The first component (13) also has a channel (15) that, at a first end, connects to a gas inlet port (16) and, at a second end, connects to the cavity (11) of the seal system. The gas supplied to the cavity (11) acts as a barrier to process gasses and effectively enhances the chemical resistance of the seal system. The gas is supplied at a rate that is sufficient to maintain a positive pressure difference ($\Delta P$), i.e. the rate of gas supply must be at least equal to the rate of gas seepage between the first and second flanges (5, 6) and the inner seal carrier (2).

The first and second components (13, 14) are retained axially by retention means (17), such as a clamp. The retention means (17) applies pressure on the outside of the first and second flanges (5, 6) to compress them on to the seal element (1). This substantially axial pressure results in compression of the seal element (1) between the first and second flanges (5, 6), and thus an improved seal. It is important that the compressive forces applied by the retention means (17) do not mechanically damage the seal element (1), as this could reduce the integrity of the seal produced. It is also important to consider the effects of thermal expansion and contraction on the seal system and select materials accordingly, as differential thermal expansion could cause damage and jeopardise the integrity of the seal.

FIG. 5 is similar to FIG. 4, illustrating an axial cross section of a seal system of the present disclosure showing the interaction of the seal system at both sides of pipework, for example, to which it is attached. Thus, the seal element (1), inner and outer seal carriers (2, 3), first and second flanges (5, 6), and retention means (17) all extend continuously about the central axis (A).

Figure 6:
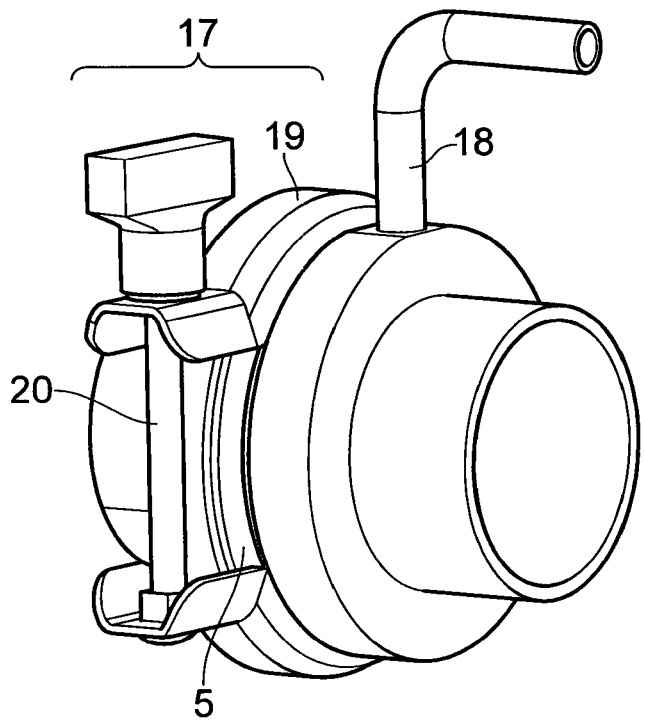
FIG. 6 is a view of an assembly showing the position of a seal system in accordance with the present disclosure.

FIG. 6 is an external view of an assembly showing positioning of a seal system in accordance with the present disclosure. The gas is supplied to the cavity through a pipe (18), which is externally mounted to the seal system. The retention means (17) comprises a clamp, which in the example shown in FIG. 6 is an NW40 Clamping Ring. The clamp comprises a metallic ribbon (19) which extends around the exterior of the first and second flanges (5, 6), encompassing at least about half, and preferably at least about three quarters of the external circumference of the first and second flanges (5, 6). The gap between the two ends of the metallic ribbon (19) is bridged by a fastener (20), by which the clamping pressure can be changed via a screwing action.

It will be appreciated that various modifications may be made to the embodiments shown without departing from the spirit and scope of the disclosure as defined by the accompanying claims as interpreted under patent law.

The invention claimed is:

1. A seal for use in a vacuum pump, the seal comprising:
a seal element positioned between an inner seal carrier and an outer seal carrier which are respectively located at an inner and outer surfaces of the seal element, wherein each of the seal element and the inner and the outer seal carriers is substantially toroidal in shape, and
a retention means to hold the seal element in position;
wherein the inner seal carrier comprises a single recess located in a surface adjacent to the seal element; and
wherein the seal element comprises a plurality of protrusions spaced apart on the inner surface of the seal element, wherein the plurality of protrusions extends into the recess of the inner seal carrier.

2. The seal according to claim 1, wherein the plurality of protrusions comprises at least three protrusions.

3. The seal according to claim 1, wherein the recess comprises a continuous groove, which extends around the outer surface of the inner seal carrier adjacent to the seal element.

4. The seal according to claim 1, wherein the dimensions of the plurality of protrusions and the at recess are such that, in use, when the seal is compressed, plurality of protrusions extend further into the at recess.

5. The seal according to claim 1, wherein each of the seal element and the inner and the outer seal carriers comprises a material which withstands temperatures of at least about 190° C.

6. The seal according to claim 5, wherein each of the seal element and the inner and the outer seal carriers comprises a material which withstands temperatures of from about 200° C. to about 250° C.

7. The seal according to claim 1, wherein the seal element comprises an elastomer.

8. The seal according to claim 7, wherein the seal element comprises a silicone-based polymer.

9. The seal according to claim 1, wherein the inner seal carrier comprises a ceramic or metallic material.

10. The seal according to claim 1, wherein the seal is a vacuum pump stator seal.

11. A seal system for use in a vacuum pump, the seal system comprising the seal as defined in claim 1 and first and second flanges positioned at either side of the seal.

12. The seal system according to claim 11, further comprising means for supplying gas, wherein the first flange comprises an inlet port through which, in use, the gas is fed into a cavity within the seal system, which is defined by surfaces of the seal element, the inner seal carrier, and the first and the second flanges.

13. The seal system according to claim 12, wherein the gas is an inert gas.

14. The seal system according to claim 11, wherein one of the first and second flanges and the inner and outer seal carriers are a unitary object.

15. A vacuum pump comprising a seal as defined in claim 11, wherein the vacuum pump comprises a dry vacuum pump.

16. A method for enhancing chemical resistance of a seal system for use in a vacuum pump, the method comprising:
fitting a seal system as defined in claim 11 into a vacuum pump.

17. The method according to claim 16, further comprising supplying inert gas to the seal system during use of the vacuum pump.

18. The method of claim 16, wherein fitting the seal system as defined in claim 10 into a vacuum pump comprises fitting the seal system into an existing vacuum pump to replace an existing seal.

19. The method of claim 17, wherein the inert gas comprises nitrogen.

* * * * *